(12) United States Patent
Uszkoreit

(10) Patent No.: US 9,448,994 B1
(45) Date of Patent: Sep. 20, 2016

(54) GRAMMAR EXTRACTION USING ANCHOR TEXT

(71) Applicant: Google Inc., Mountain View, CA (US)

(72) Inventor: Jakob D. Uszkoreit, San Francisco, CA (US)

(73) Assignee: Google Inc., Mountain View, CA (US)

(*) Notice: Subject to any disclaimer, the term of this patent is extended or adjusted under 35 U.S.C. 154(b) by 230 days.

(21) Appl. No.: 14/040,012

(22) Filed: Sep. 27, 2013

Related U.S. Application Data

(60) Provisional application No. 61/779,588, filed on Mar. 13, 2013.

(51) Int. Cl.
G06F 17/28 (2006.01)

(52) U.S. Cl.
CPC .................................. G06F 17/28 (2013.01)

(58) Field of Classification Search
None
See application file for complete search history.

(56) References Cited

U.S. PATENT DOCUMENTS

| | | | |
|---|---|---|---|
| 6,167,368 A | 12/2000 | Wacholder | |
| 6,434,523 B1 | 8/2002 | Monaco | |
| 6,757,676 B1 | 6/2004 | Sugaya et al. | |
| 8,335,690 B1 | 12/2012 | Bansal et al. | |
| 2005/0154580 A1 | 7/2005 | Horowitz et al. | |
| 2008/0104113 A1* | 5/2008 | Wong et al. | 707/104.1 |
| 2012/0239379 A1* | 9/2012 | Gershnik | 704/8 |
| 2013/0031083 A1* | 1/2013 | Madhavan | G06F 17/30864 707/713 |
| 2013/0297318 A1* | 11/2013 | Balasubramanyam et al. | 704/275 |
| 2013/0332443 A1* | 12/2013 | Opalinski | G06F 17/30864 707/709 |
| 2014/0006030 A1* | 1/2014 | Fleizach et al. | 704/260 |

* cited by examiner

Primary Examiner — Vinvent Rudolph
Assistant Examiner — Richa Mishra
(74) Attorney, Agent, or Firm — Fish & Richardson P.C.

(57) ABSTRACT

Methods, systems, and apparatus, including computer programs encoded on a computer storage medium, for rating participants based on emotive feedback. In one aspect, a method includes identifying a first resource that includes a form associated with a particular action, identifying, using one or more computers, a second resource that references the form of the first resource, identifying anchor text in the second resource that references the form, and adding the identified anchor text to a set of phrases that is used for generating an action initiation grammar associated with the particular action.

18 Claims, 6 Drawing Sheets

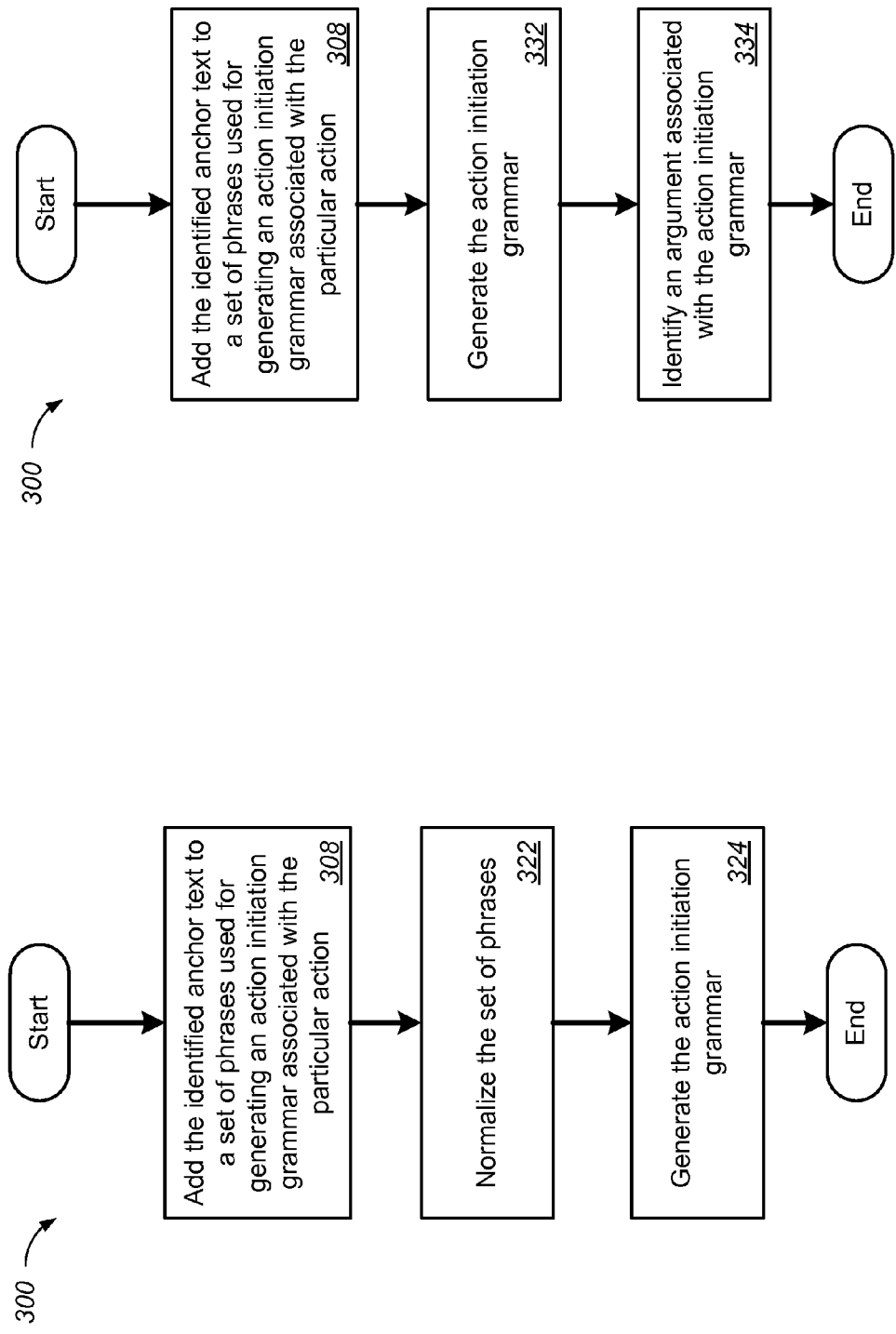

GRAMMAR EXTRACTION USING ANCHOR TEXT

CROSS-REFERENCE TO RELATED APPLICATION

This application claims the benefit of U.S. Provisional Application Ser. No. 61/779,588, filed on Mar. 13, 2013, which is incorporated by reference

TECHNICAL FIELD

This specification generally relates to search systems, and one particular implementation relates to identifying grammar associated with a voice action.

BACKGROUND

Different voice actions have different grammars for initiating each action. For example, a grammar for making a restaurant reservation may include the phrases such as "making a reservation at 7 o'clock on Friday" or "can you find a table for me here?" A collection of grammars associated with a particular action may be derived using anchor texts in indexed resources.

BRIEF DESCRIPTION OF THE DRAWINGS

FIG. 3B is a flow chart illustrating an example process for generating action initiation grammar based on normalized anchor text.

FIG. 3C is a flow chart illustrating an example process for identifying anchor text to generate arguments associated with action initiation grammar.

Like reference numbers and designations in the various drawings indicate like elements.

DETAILED DESCRIPTION

Figure 1:
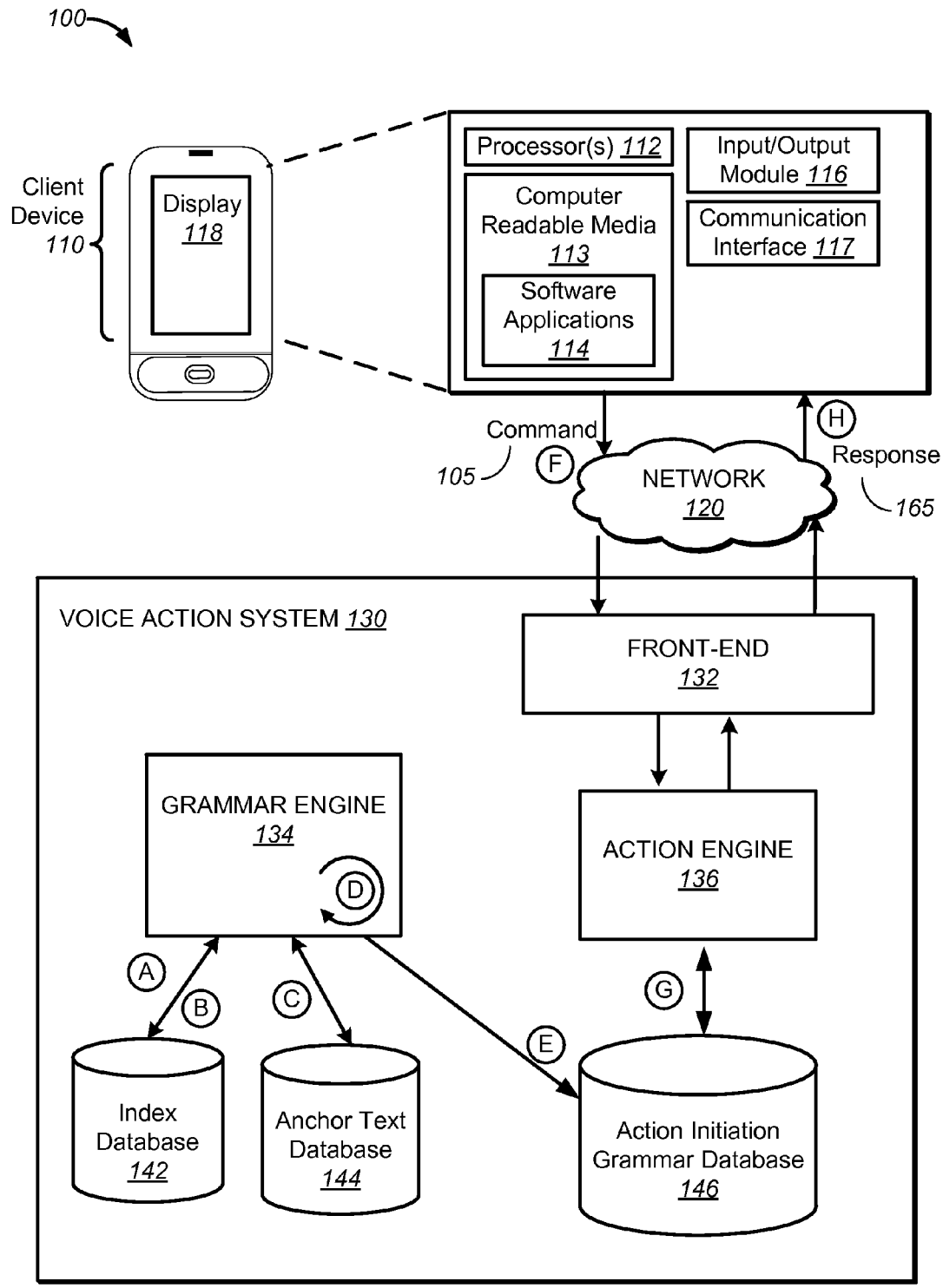
FIG. 1 is a block diagram of an example system that can use anchor text to generate action initiation grammar.

FIG. 1 is a diagram of an example system that can use anchor text to generate action initiation grammar. Briefly, the system 100 includes a client device 110 coupled to a voice action system 130 over a network 120. The voice action system 130 includes a front-end 132, a grammar engine 134, and an action engine 136. The voice action system 130 may identify a resource that is associated with an action. An action may be the act of offering a particular service to a user (e.g., a web site that offers table reservations). The voice action system 130 may collect anchors in other resources that point to the identified resource, extract the respective anchor text, and generate action initiation grammar associated with the action based on the anchor text. The action initiation grammar may include a set of one or more terms associated with the action to be performed by the voice action system 130 or the client device 110.

In general, anchor text is the text associated with, and displayed for, the anchor in a resource. An anchor typically links to a destination resource as specified by an anchor tag of the anchor. Anchor text is the text surrounded by anchor tags, and generally includes natural language describing the destination on the link defined by the anchor tags. For example, an anchor can be represented by the following code:

<a href=URL_of Destination_Resource>Make a reservation</a>,

In the above code, the text "URL_of Destination_Resource" is the Uniform Resource Locator (URL) for the destination resource, and the text "Make a reservation" is the anchor text for the anchor.

The voice action system 130 may receive a command, referred to by this specification as a "voice command," a "command," or a "query," from the client device 110 over the network 120. The voice system 130 identifies an action based on the grammar of the command. In some implementations, the voice action system 130 may initiate the action or subsequent interactions with the client device 110 over the network 120. In some implementations, the voice action system 130 may send a response to the client device 110 over the network 120, and the client device 110 may initiate the action or subsequent interactions based on the response.

The grammar engine 134 identifies anchor text associated with an action from resources stored at the index database 142. The grammar engine 134 may then analyze the anchor text and generate one or more action initiation grammars associated with the action. Once the action initiation grammars have been generated, the grammar engine 134 may store the action initiation grammars at the action initiation grammar database 146.

The action engine 136 receives requests from the front-end 132, and determines corresponding actions to be performed based on the received requests. In some implementations, the action engine 136 determines the action to be performed based on action initiation grammars stored at the action initiation grammar database 146.

As used in this specification, an "engine" (or "software engine") refers to a software implemented input/output system that provides an output that is different from the input. An engine can be an encoded block of functionality, such as a library, a platform, a Software Development Kit ("SDK"), or an object. The network 120 can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The front-end 132, the grammar engine 134, and the action engine 136 may be implemented on any appropriate type of computing device (e.g., servers, mobile phones, tablet computers, notebook computers, music players, e-book readers, laptop or desktop computers, PDAs, smart phones, or other stationary or portable devices) that includes one or more processors and computer readable media. Among other components, the client device 110 includes one or more processors 112, computer readable media 113 that store software applications 114 (e.g., a browser or layout engine or voice recognition engine), an input/output module 116 (e.g., a keyboard or mouse), a communication interface 117, and a display device 118. The input/output module 116 may also include audio input/output devices that allow a user to communicate with client device 116 via speech. For example, these audio input/output devices may include one or more microphones and/or one or more speakers. The computing device or devices that implement the front-end 132, the grammar engine 134, and the action engine 136 may include similar or different components.

In some implementations, two or more of a front-end 132, the grammar engine 134, and the action engine 136 may be implemented on the same computing device, or on different computing devices. In some implementations, the voice action system 130 may include many computing devices for implementing the functionality of the voice action system 130. The voice action system 130 can process the received commands and generate the responses by executing software on the computing devices in order to perform the functions of the voice action system 130.

FIG. 1 also illustrates an example flow of data, shown in stages (A) to (H). Stages (A) to (H) may occur in the illustrated sequence, or they may occur in a sequence that is different than in the illustrated sequence. In some implementations, one or more of the stages (A) to (H) may occur offline, where the voice action system 130 may perform computations when some users are not connected to the voice action system 130.

During stage (A), the grammar engine 134 identifies, from the index database 142, a first resource associated with a particular action. In general, the index database 142 may store indexed data representing resources according to their relevance to particular actions. In some implementations, the index database 142 may be generated and updated by a remote search system, and then be accessed by the voice action system 130. In some other implementations, the index database 142 may be generated and updated by the voice action system 130. In some implementations, a particular resource may be indexed to be associated to one particular action. In some implementations, a particular resource may be indexed to be associated to multiple actions.

A resource may, but need not, correspond to a file. A resource may be stored in a portion of a file that holds other resources, in a single file dedicated to the resource, or in multiple coordinated files. In some implementations, resources are web pages (e.g., markup language documents such as Hypertext Markup Language documents). Other types of resources, for example, images and videos, are also possible. Here, the first resource may a web page that includes a form for performing a particular action. For example, the first resource may provide a service for making a restaurant reservation, and may include a form that allows a user to specify relevant information to complete the reservation.

During stage (B), the grammar engine 134 identifies, from the index database 142, one or more second resources that reference the first resource. In general, the index database 142 may also store indexed data representing relationships between two or more resources. For example, the index database 142 may store indexed data specifying that the second resources are linked to the first resource. In some implementations, the one or more second resources may reference the form of the first resource via anchors. For example, a second resource may include content introducing a recently opened restaurant, and at the end of the content, the second resource may include an anchor that directs the user to the first resource to initiate the action of making a reservation. In some implementations, the grammar engine 134 may identify anchor text in a second resource. For example, the anchor of a second resource may include anchor text of "We can squeeze you in at Mario's!"

During stage (C), the grammar engine 134 adds the identified anchor text to a set of phrases stored at the anchor text database 144, where the set of phrases are used for generating one or more action initiation grammars associated with the particular action. In general, the anchor text database 144 may store multiple sets of phrases associated with action initiation grammars of various actions. In some implementations, the grammar engine 134 may add a phrase to the anchor text database 144. In some implementations, the grammar engine 134 may modify, or normalize, a phrase before adding it to the anchor text database 144. In some implementations, the grammar engine 134 may remove a phrase from the anchor text database 144.

During stage (D), the grammar engine 134, by using the set of phrases stored at the anchor text database 144, generates an action initiation grammar that is associated with the particular action. In general, an action initiation grammar may include a set of one or more terms associated with a particular action. The action initiation grammar may be in a form similar to natural language usages that are different from a typical query submitted to a search engine. For example, the grammar engine 134 may determine that the terms "squeeze in at" is a grammar associated with making a restaurant reservation.

In some implementations, the grammar engine 134 may identify one or more terms in the anchor text as an argument associated with the action initiation grammar. For example, the grammar engine 134 may identify that the term "Mario's" is an argument for making a reservation, and not a part of the action initiation grammar.

During stage (E), the grammar engine 134 adds the generated action initiation grammar to the action initiation grammar database 146. In general, the action initiation grammar database 146 stores data representing action initiation grammars associated with actions. In some implementations, the action initiation grammar database 146 also stores data representing arguments associated with the action initiation grammars or the actions.

During stage (F), the client device 110 sends a command 105 to the voice action system 130 via the network 120. In some implementations, the command 105 may be a voice command. In some other implementations, the command 105 may be a command manually entered by the user of the client device 110. In some implementations, the command 105 may be processed by a voice-recognition program on the client device 110 before transmitting to the voice action system 130. In some implementations, the command 105 may be in an audio format while being transmitted to the voice action system 130.

The front-end 132 receives the command 105, and forwards the command 105 to the action engine 136. In some implementations, the front-end 132 may forwards a modified command to the action engine 136. For example, the front-end 132 may process the command 105 from an audio format to a text format before sending the command 105 to the action engine 136.

During stage (G), the action engine 136 determines whether the command 105 includes an action initiation grammar corresponding to a particular action. In some implementations, the action engine 136 sends the command 105 to the action initiation grammar database 146 for a match.

In some implementations, if there is a match, the action engine 136 may initiate the particular action for the client device 110. For example, the action engine 136 may complete a restaurant reservation for the user of the client device 110. In some other implementations, if there is a match, the action engine 136 may generate a response identifying the particular action, and send the response to the client device 110 for the client device 110 to initiate the particular action. In some other implementations, if there is a match, the action engine 136 may generate a response to be sent to the client device 110, where the client device 110 may then collect additional information from the user.

During stage (H), the voice action system 130 sends a response 165 to the client device 110. In some implementations, the response 165 may include an indication of whether the command has been satisfied by the voice action system 130. In some implementations, the response 165 may include instructions for the client device 110 to perform the particular action.

Figure 2A:
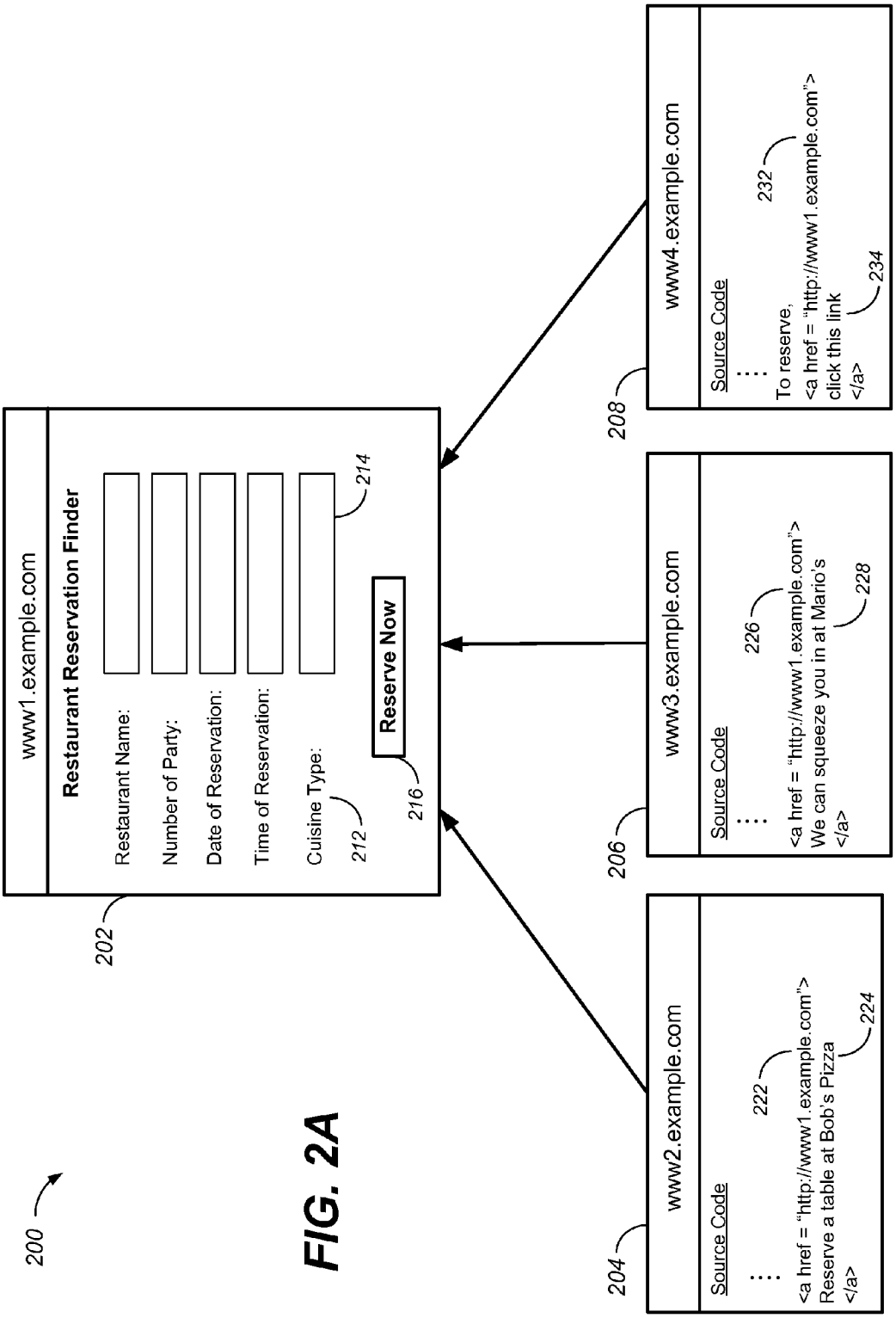
FIG. 2A is a block diagram of example resources that include anchors pointing to a particular resource with a form associated with an action.

FIG. 2A is a block diagram 200 of example second resources that include anchors pointing to a first resource with a form associated with an action. The process 200 will be described as being performed by a computer system comprising one or more computers, for example, the grammar engine 134 as shown in FIG. 1. In some implementations, the example resources may be indexed by a search system, and the index may be stored at the index database 142 as shown in FIG. 1. In some implementations, all of the resources may be on a same domain. In some other implementations, a resource may be on a different domain from another reference.

A first resource 202 is a web site having an URL "www1.example.com" that includes a form, where the form is associated with a particular action of reserving a restaurant for a user of a client device. The form may include one or more attribute names 212 (e.g., Cuisine Type), and one or more fields 214 for inputting attribute values associated with respective attribute names 212. Upon completion of the form, the user may submit the form to a server by clicking on a button 216 "Reserve Now" as displayed on the form.

In some implementations, there may be one or more second resources that reference the first resource 202 or the form of the first resource 202. Here, second resources 204, 206, and 208 include anchors 222, 226, and 232, respectively, where the anchors 222, 226, and 232 link the second resources 204, 206, and 208 to the first resource 202. The anchors 222, 226, and 232 include anchor text 224, 228, and 234, respectively.

In some implementations, an anchor may include anchor text that is easily identifiable to be associated with an action. For example, the anchor text 224 "Reserve a table at Bob's Pizza" is clearly associated with the action of making a restaurant reservation.

In some implementations, an anchor may include anchor text that is not easily identifiable to be associated with an action. For example, when a system analyzes the anchor text 228 "We can squeeze you in at Mario's," the system may associate the anchor text 228 with an action of squeezing, not the action of making a restaurant reservation.

In some implementations, an anchor may include anchor text that is not relevant with an action. For example, the anchor text 234 "Click this link" has nothing to do with the action of making a restaurant reservation.

Figure 2B:
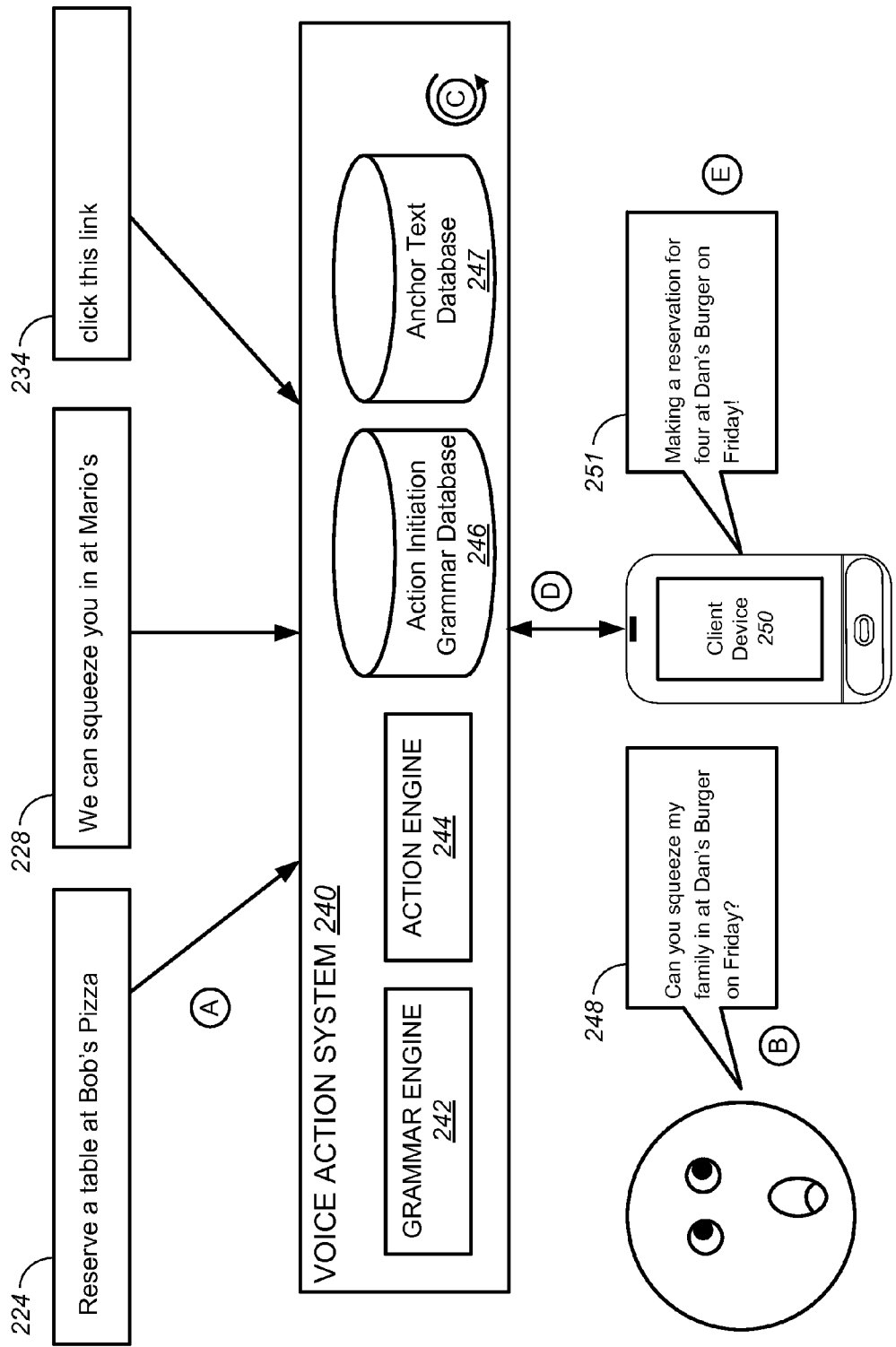
FIG. 2B is a block diagram of an example system for generating and using action initiation grammar.

FIG. 2B is a block diagram 200 of an example system for generating and using action initiation grammar. In general, the system 200 includes a client device 250 coupled to a voice action system 240 over a network. The voice action system 240 includes a grammar engine 242 and an action engine 244. The voice action system 240 may be implemented by a computer system comprising one or more computers, for example, the voice action system 130 as shown in FIG. 1.

FIG. 2B also illustrates an example flow of data, shown in stages (A) to (D). Stages (A) to (E) may occur in the illustrated sequence, or they may occur in a sequence that is different than in the illustrated sequence. In some implementations, one or more of the stages (A) to (E) may occur offline, where the voice action system 240 may perform computations when some users are not connected to the voice action system 240.

During stage (A), the grammar engine 242, based on the anchor text 224, 228, and 234, generates one or more action initiation grammars that are associated with the action of making a restaurant reservation. Here, the grammar engine 242 may determine that the terms "squeeze in at" and "reserve a table" are grammars associated with the action of making a restaurant reservation. The grammar engine 242 may also determine that the terms "click this link" is not a grammar associated with the action of making a restaurant reservation. In some implementations, the grammar engine 242 adds the generated action initiation grammars to the action initiation grammar database 246.

In some implementations, the grammar engine 242 may identify one or more terms in the anchor text 224, 228, and 234 as arguments associated with the action initiation grammar. Here, the grammar engine 242 may identify that the term "Mario's" and "Bob's Pizza" as arguments for making a reservation.

During stage (B), a user of the client device 250 sends a command 248 to the voice action system 240 via the network. Here, the command 248 is a voice command stating "Can you squeeze my family in at Dan's Burger on Friday?" In some implementations, the command 248 may be processed by a voice-recognition program on the client device 250 before transmitting to the voice action system 240. In some implementations, the command 248 may be in an audio format while being transmitted to the voice action system 240.

During stage (C), the voice action system 240 determines whether the command 248 includes an action initiation grammar corresponding to a particular action. Here, the action engine 244 sends the command 248 to the action initiation grammar database 246 for a match. In some implementations, the action engine 244 may revise, or normalize, the command 248 before sending the revised command to the action initiation grammar database 246.

In this example, the action engine 244 determines that the terms "squeeze in at" in the command 248 matches a grammar associated with making a restaurant reservation stored at the action initiation grammar database 246. Based on the grammar, the action engine 244 may also determine that the terms "Dan's burger" in the command 248 is an argument associated with the action. In some implementations, the action engine 244 may further determine that the terms "my family" and "Friday" in the command 248 are contextual arguments associated with the action.

In some implementations, the action engine 244 may initiate the particular action for the client device 250. For example, the action engine 244 may complete the restaurant reservation for the user's family at Dan's Burger at an available time slot on Friday. In some other implementations, the action engine 244 may generate a response identifying the particular action, and send the response to the client device 250 for the client device 250 to initiate the particular action of making a restaurant reservation. In some other implementations, the action engine 244 may generate a response to be sent to the client device 250 to collect additional information from the user. For example, there may be multiple time slots available at Dan's Burger on Friday, and the action engine 244 may generate a response specifying that (i) the action is associated with making a restaurant reservation, and (ii) more information is required to complete the reservation.

During stage (D), the voice action system 240 sends a response to the client device 250. In some implementations, the response may include an indication of whether the command has been satisfied by the voice action system 240. In some implementations, the response may include instructions for the client device 250 to perform the particular action.

During stage (E), the client device 250 processes the response, and outputs the response to the user. Here, the client device 250 outputs through a speaker a message "Making a reservation for four at Dan's Burger on Friday!" indicating a restaurant reservation has been completed. In some implementations, the client device 250 may output the message through a display of the client device 250.

Figure 2C:
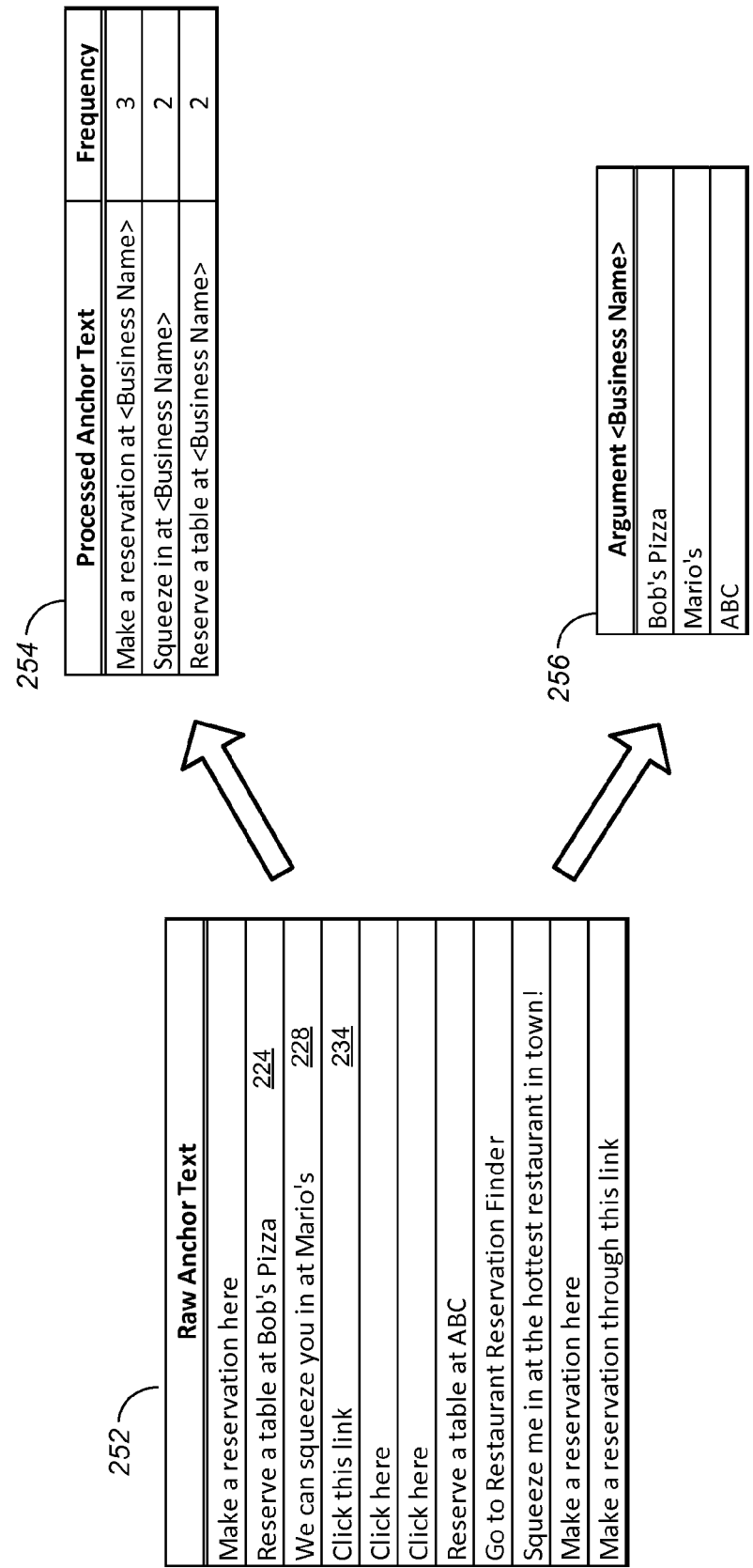
FIG. 2C is an example block diagram of how to process anchor text and arguments.

FIG. 2C is an example block diagram 200 of how to process anchor text and arguments. The process 200 will be described as being performed by a computer system comprising one or more computers, for example, the grammar engine 244 as shown in FIG. 2B.

The block diagram 200 includes a raw anchor text table 252, a processed anchor text table 254, and an argument table 256. In some implementations, the anchor text database 247 stores the raw anchor text table 252, and the action initiation grammar database 246 stores the processed anchor text table 254 and the argument table 256. The format of data as shown in the tables 252, 254, 256 is for the purpose of illustration. In some implementations, the format of data stored at the anchor text database 247 and the action initiation grammar database 246 is different from the format as shown in tables 252, 254, and 256.

In general, the data in the raw anchor text table 252 represents anchor text extracted from anchors of resources. As an example, the raw anchor text table 252 stores all anchor text where the corresponding anchors point to the first resource 202. In some implementations, the anchor text database 247 stores multiple raw anchor text tables, where each raw anchor text table corresponds to a different resource associated with a respective action. Here, the raw anchor text table 252 includes anchor text 224, 228, 234, as well as other anchor text that has been added by the grammar engine 244.

The grammar engine 244, by using the set of phrases stored at the raw anchor text table 252, generates an action initiation grammar that is associated with the particular action. In some implementations, the grammar engine 244 generates the action initiation grammar by identifying a frequency of occurrence of a particular phrase of the set, and generating the action initiation grammar based on the identified frequency of occurrence of the particular phrase. In some implementations, the grammar engine 244 normalizes the anchor text before identifying the frequency of occurrence of a particular phrase. The grammar engine 244 may normalize the anchor text by removing one or more terms from the anchor text, substituting a term in the anchor text by a substituted term, reordering the terms in the anchor text, or adding one or more terms to the anchor text. For example, the grammar engine 244 may normalize the anchor text 228 as "Squeeze in at <business name>."

Here, the grammar engine 244 may normalize the anchor text in the raw anchor text table 252, and then determines that the counts associated with normalized phrases "Make a reservation at <business name>," "Squeeze in at <business name>," "Reserve a table at <business name>," and "Click here" are 3, 2, 2, and 4, respectively. The grammar engine 244 may determine that the normalized phrases "Make a reservation at <business name>," "Squeeze in at <business name>," and "Reserve a table at <business name>" are action initiation grammars associated with the action of making a restaurant reservation, and subsequently add these normalized phrases and the corresponding frequency counts to the processed anchor text table 254. The grammar engine 244 may determine that the normalized phrase "Click here" is not associated with the action of making a restaurant reservation, and as the result the grammar engine 244 would not add this normalized phrase to the processed anchor text table 254.

In some implementations, the grammar engine 244 may identify one or more terms in the anchor text as arguments associated with the action initiation grammar. For example, the grammar engine 244 may identify that the terms "Bob's Pizza," "Mario's" and "ABC" are arguments for making a restaurant reservation, and not a part of the action initiation grammar. Subsequently, the grammar engine 244 may add these arguments to the argument table 256.

Figure 3A:
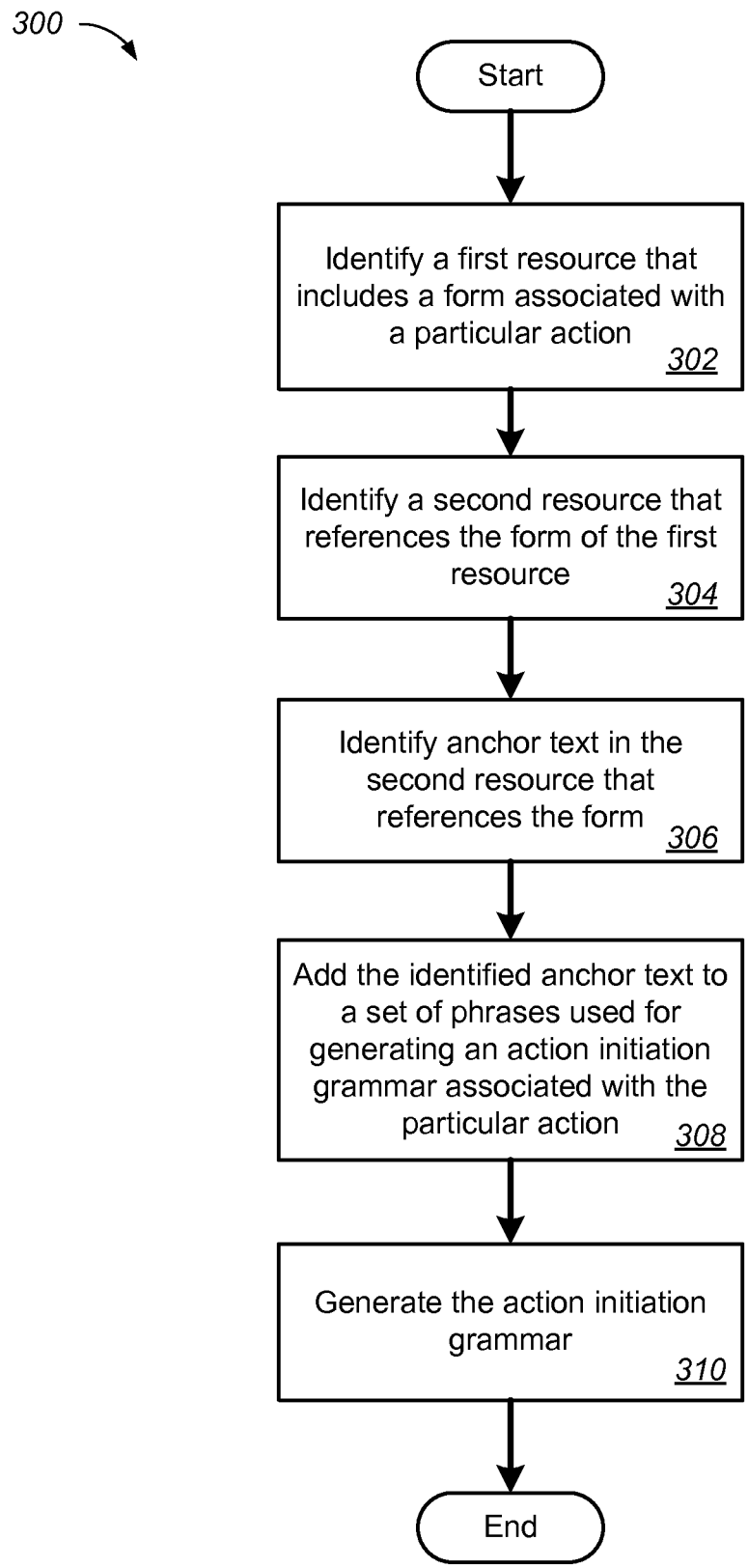
FIG. 3A is a flow chart illustrating an example process for identifying anchor text to generate action initiation grammar.

FIG. 3A is a flow chart 300 illustrating an example process for identifying anchor text to generate action initiation grammar. In general, the process 300 analyzes a set of anchor texts that are linked to a resource associated with an action, and generates grammar associated with the action from the set. The process 300 will be described as being performed by a computer system comprising one or more computers, for example, the grammar engine 134 as shown in FIG. 1.

The system identifies a first resource that includes a form associated with a particular action (302). The system may identify the first resource from an index database. In general, the index database may store indexed data representing resources according to their relevance to particular actions. In some implementations, the index database may be generated and updated by a remote search system, and then be accessed by the system. In some other implementations, the index database may be generated and updated by the system. Here, the first resource may a web page that includes a form for performing a particular action.

The system then identifies a second resource that references the form of the first resource (304). The index database may store indexed data representing relationships between two or more resources, and the system may identify the second resource in the index database. In some implementations, the second resource references the first resource or the form of the first resource via an anchor.

The system identifies anchor text in the second resource that references the form (306). The system then adds the identified anchor text to a set of phrases used for generating an action initiation grammar associated with the particular action (308). In some implementations, the system adds the identified anchor text to an anchor text database. In general, the anchor text database may store multiple sets of phrases associated with action initiation grammars of various actions. In some implementations, the system may add a phrase to the anchor text database. In some implementations, the system may modify, or normalize, a phrase before adding it to the anchor text database. In some implementations, the system may remove a phrase from the anchor text database.

The system generates the action initiation grammar (310). In general, an action initiation grammar may include a set of one or more terms associated with a particular action. The action initiation grammar may be in a form similar to natural language usages that are different from a typical query submitted to a search engine. In some implementations, the system generates the action initiation grammar by identifying a frequency of occurrence of a particular phrase of the set, and generating the action initiation grammar based on the identified frequency of occurrence of the particular phrase. In some implementations, the system subsequently may add the generated action initiation grammar to an action initiation grammar database. In some implementations, the system may determine that certain anchor texts (e.g., "Go to this web page") are not associated with the particular action. The system would not add these anchor texts to the action initiation grammar database.

FIG. 3B is a flow chart 300 illustrating an example process for generating action initiation grammar based on normalized anchor text.

As described in FIG. 3A, the system adds the identified anchor text to a set of phrases used for generating an action initiation grammar associated with the particular action (308). The system then normalizes the set of phrases (310). The system may normalize the anchor text by removing one or more terms from the anchor text, substituting a term in the anchor text by a substituted term, reordering the terms in the anchor text, or adding one or more terms to the anchor text. For example, the system may normalize the anchor text "We can squeeze you in at Mario's" to "Squeeze in at <business name>."

Then system then generates the action initiation grammar based on the normalized phrases (312). The system may determine that certain normalized phrases are action initiation grammars associated with the particular action, and subsequently add these normalized phrases to the action initiation grammar database. The system may determine that certain normalized phrases (e.g., "Click here") are not associated with the particular action. The system would not add these normalized phrases to the action initiation grammar database.

FIG. 3C is a flow chart 300 illustrating an example process for identifying anchor text to generate arguments associated with action initiation grammar.

As described in FIG. 3A, the system adds the identified anchor text to a set of phrases used for generating an action initiation grammar associated with the particular action (308). The system generates the action initiation grammar (332). In some implementations, the system generates the action initiation grammar by identifying a frequency of occurrence of a particular phrase of the set, and generating the action initiation grammar based on the identified frequency of occurrence of the particular phrase. In some implementations, the system normalizes the anchor text before identifying the frequency of occurrence of a particular phrase.

The system then identifies an argument associated with the action initiation grammar (334). The system may then add the identified argument to the action initiation grammar database for subsequent commands.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
   identifying, using one or more computers, a first web page that includes a form associated with a particular action;
   identifying, using one or more computers, a second web page comprising a hyperlink that references the form of the first web page and that comprises hyperlink text;
   identifying, using one or more computers, the hyperlink text associated with the hyperlink in the second web page that references the form;

adding the identified hyperlink text to a set of phrases that is used for generating an action initiation grammar associated with the particular action;
generating the action initiation grammar associated with the particular action using the set of phrases;
receiving an utterance;
obtaining, using an automated speech recognizer, a transcription of the utterance;
determining that at least a portion of the transcription of the utterance is included in the action initiation grammar associated with the particular action; and
triggering the particular action to be performed in response to determining that at least a portion of the transcription of the utterance is included in the action initiation grammar associated with the particular action.

2. The method of claim 1, wherein generating the action initiation grammar associated with the particular action further comprises:
identifying a frequency of occurrence of a particular phrase of the set; and
generating the action initiation grammar based on the identified frequency of occurrence of the particular phrase.

3. The method of claim 1, wherein generating the action initiation grammar associated with the particular action further comprises:
normalizing the hyperlink text; and
generating the action initiation grammar based on the normalized hyperlink text.

4. The method of claim 1, further comprising:
identifying a term in the identified hyperlink text as an argument associated with the action initiation grammar.

5. The method of claim 4, wherein the argument is a value associated with a parameter of the form.

6. The method of claim 1, wherein the second web page is on a different domain than the first web page.

7. A non-transitory computer-readable medium storing software having stored thereon instructions, which, when executed by one or more computers, cause the one or more computers to perform operations of:
identifying, using one or more computers, a first web page that includes a form associated with a particular action;
identifying, using one or more computers, a second web page comprising a hyperlink that references the form of the first web page and that comprises hyperlink text;
identifying, using one or more computers, the hyperlink text associated with the hyperlink in the second web page that references the form;
adding the identified hyperlink text to a set of phrases that is used for generating an action initiation grammar associated with the particular action;
generating the action initiation grammar associated with the particular action using the set of phrases;
receiving an utterance;
obtaining, using an automated speech recognizer, a transcription of the utterance;
determining that at least a portion of the transcription of the utterance is included in the action initiation grammar associated with the particular action; and
triggering the particular action to be performed in response to determining that at least a portion of the transcription or the utterance is included in the action initiation grammar associated with the particular action.

8. The computer-readable medium of claim 7, wherein generating the action initiation grammar associated with the particular action further comprises:
identifying a frequency of occurrence of a particular phrase of the set; and
generating the action initiation grammar based on the identified frequency of occurrence of the particular phrase.

9. The computer-readable medium of claim 7, wherein generating the action initiation grammar associated with the particular action further comprises:
normalizing the hyperlink text; and
generating the action initiation grammar based on the normalized hyperlink text.

10. The computer-readable medium of claim 7, wherein the operations further comprise:
identifying a term in the identified hyperlink text as an argument associated with the action initiation grammar.

11. The computer-readable medium of claim 10, wherein the argument is a value associated with a parameter of the form.

12. The computer-readable medium of claim 7, wherein the second web page is on a different domain than the first web page.

13. A system comprising:
one or more computers and one or more storage devices storing instructions that are operable, when executed by one or more computers, cause the one or more computers to perform operations comprising:
identifying, using one or more computers, a first web page that includes a form associated with a particular action;
identifying, using one or more computers, a second web page comprising a hyperlink that references the form of the first web page and that comprises hyperlink text;
identifying, using one or more computers, the hyperlink text associated with the hyperlink in the second web page that references the form;
adding the identified hyperlink text to a set of phrases that is used for generating an action initiation grammar associated with the particular action;
generating the action initiation grammar associated with the particular action using the set of phrases;
receiving an utterance;
obtaining, using an automated speech recognizer, a transcription of the utterance;
determining that a least a portion or the transcription of the utterance included in the action initiation grammar associated with the particular action; and
triggering the particular action to be performed in response to determining that at least portion of the transcription of the utterance is included in the action initiation grammar associated with the particular action.

14. The system of claim 13, wherein generating the action initiation grammar associated with the particular action further comprises:
identifying a frequency of occurrence of a particular phrase of the set; and
generating the action initiation grammar based on the identified frequency of occurrence of the particular phrase.

15. The system of claim 13, wherein generating the action initiation grammar associated with the particular action further comprises:
normalizing the hyperlink text; and
generating the action initiation grammar based on the normalized hyperlink text.

16. The system of claim 13, wherein the operations further comprise:
    identifying a term in the identified hyperlink text as an argument associated with the action initiation grammar.

17. The system of claim 16, wherein the argument is a value associated with a parameter of the form.

18. The system of claim 13, wherein the second web page is on a different domain than the first web page.

* * * * *